Figures 1, 2:
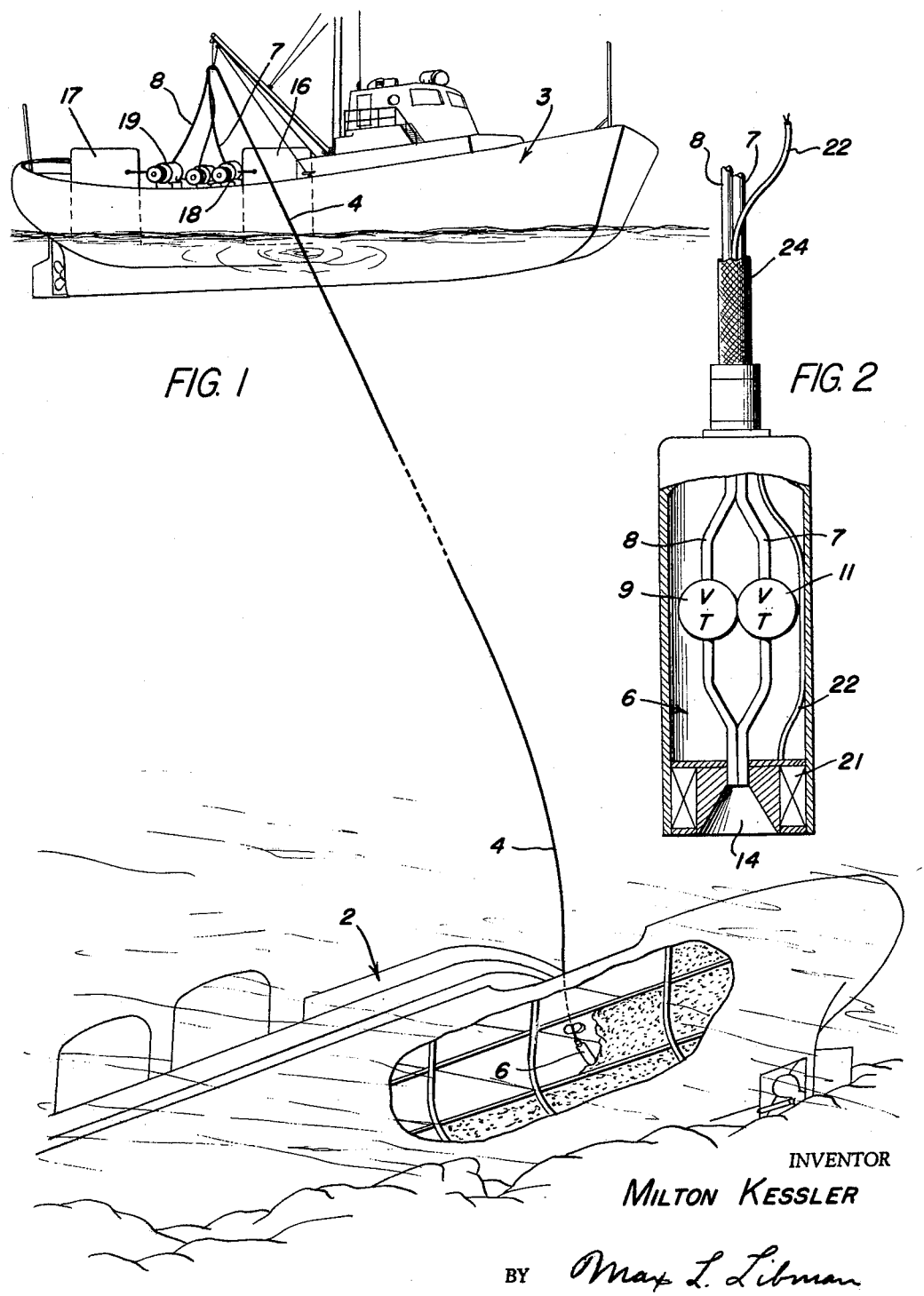

Oct. 9, 1962 M. KESSLER 3,057,694
APPARATUS FOR RAISING SUNKEN SHIPS
Filed Dec. 15, 1958

INVENTOR
MILTON KESSLER

BY Max L. Libman

ATTORNEY

United States Patent Office 3,057,694
Patented Oct. 9, 1962

3,057,694
APPARATUS FOR RAISING SUNKEN SHIPS
Milton Kessler, 4535 Grove Drive, Youngstown, Ohio
Filed Dec. 15, 1958, Ser. No. 780,475
2 Claims. (Cl. 23—252)

This invention relates to a method and apparatus for raising sunken vessels, and more particularly to a method for raising sunken vessels by pumping into them a mass of foaming plastic material to displace the water in such vessels.

It has been proposed to raise sunken ships by various methods, including the attachment of tanks to the sunken vessel and the subsequent pumping out of the water (or pumping in of air) from the attached tanks until their buoyancy is sufficient to raise the vessel, which can then be towed to a convenient harbor or dock for salvage or repair. All of the prior art methods of which I am aware have the disadvantage of being very expensive, dangerous to carry out in waters which are often very rough, and requiring a considerable amount of submarine operation. To date, no generally satisfactory method of raising sunken ships has been evolved.

It is a major object of the invention to provide a method and apparatus for raising sunken ships which obviates the disadvantages of the prior art methods and apparatus in being relatively inexpensive, simple to apply, and not requiring extensive underwater work or special treatment of the sunken vessel, such as fastening on tanks under water, etc.

Foamed plastics, similar to foam rubber except for being relatively rigid, have been developed and are available. By mixing the plastic material in a soft plastic or liquid condition with gas-evolving chemicals, a foam material can be produced which has an extremely low specific gravity. For example, it is possible to produce a foam material having a weight per cubic foot of less than one-half pound. This means that each cubic foot of the material can produce approximately sixty pounds of buoyancy, and it will be apparent that a relatively small amount of this material will be sufficient under most conditions to provide sufficient buoyancy to raise the sunken vessel. This material is widely used for thermal insulation, as a bulk material, and as a low specific gravity material. It resembles the well-known foam rubber except for the strength and rigidity which it acquires on setting. According to the invention, the material is produced in situ in the hold or other enclosed compartment of a sunken vessel to raise it. I have discovered that foam plastic can be successfully produced under water, even at a pressure in the order of 100 p.s.i., and that it can be used to displace water when so produced. By carrying out this process directly in the hold of a sunken ship, all of the openings which have been closed sufficiently to retain the foamed plastic mass, the vessel can finally be made sufficiently buoyant to rise to the surface and to float thereon.

It is also an object of the invention to provide improved apparatus for applying the foamed plastic from a surface boat to the sunken ship. This apparatus includes means for mixing the ingredients on the surface boat, and hose means for piping the plastic material to the point where it is to be used, and including means for keeping the plastic material at the optimum condition by heating it as it is being produced.

The specific nature of my invention as well as other objects and advantages thereof will clearly appear from a description of a preferred embodiment as shown in the accompanying drawing, in which:

FIG. 1 is a schematic diagram showing the manner in which the invention is applied to the raising of a sunken ship; and FIG. 2 is a schematic diagram, partly in section, showing a nozzle used in the ship to produce the plastic foam under water.

Referring to FIG. 1, the sunken vessel 2 is depicted lying on the bottom, at a depth that can be reached by divers. A surface vessel 3, which may be the same vessel from which the divers are working, or a vessel specially equipped for the plastic foam operation, is provided with any conventional means (not shown) for supplying the foam ingredients to a hose 4, which is preferably provided with a special mixing nozzle, 6, shown in FIG. 2.

The hose 4 is preferably composed of two separate hose lines 7 and 8, respectively provided at their free ends with throttle valves 9 and 11, which can be manually controlled by the diver operating the equipment. Alternatively, the throttle valve at the free end of the hose can be dispensed with, and the control of the plastic ingredients can be accomplished from the vessel where the ingredients are pumped into the two hoses. However, there is an advantage in providing the valves at the bottom end, which insures that both of the major ingredients flow together into the mixing nozzle 14, to minimize wastage of the ingredients. One of the hoses, for example, hose 7 is fed from a tank 16 containing, for example, a mixture of the following ingredients: No. 1.—Nacconate 1080–H, Witco 77–86 and water; and the other hose 8 is fed from a tank 17 with the following: No. 2.—a material known as N-Methylmorpholine. Both of these ingredients are manufactured by the Barrett Division of Allied Chemical and Dye Corporation, Toledo, Ohio.

One form of spraying installation suitable for this invention is shown in U.S. patent to Bauer, No. 2,860,856, issued November 18, 1958.

A pump 18 is shown connected to hose 7 for forcing mixture No. 1 into hose 7, and a similar pump 19 is used for ingredient No. 2. Alternatively, a dual pump can be used, since the two mixtures must be pumped down together. It is necessary to pump each mixture down a separate hose to prevent interaction of the ingredients in the hose, which would not only clog the hose but probably also rupture it. At the far or under water end, the two hoses are combined in a single nozzle 6, which is preferably provided with an electric heating coil 21, fed from a surface generator through a power cable 22, which must, of course, also be properly insulated and waterproofed. The foaming reaction is greatly accelerated by heat, and tends to be retarded by the low temperatures usually found in large bodies of water, and the heating coil is therefore provided in order to establish the optimum foaming temperature at the nozzle just as the ingredients are being mixed.

In the practicing of the invention, the nozzle is carried by a diver to the sunken vessel, which ordinarily contains many compartments which are sufficiently intact so that it is a simple matter to insert the nozzle into one of them, and commence the production of plastic foam into the interior. The foam material should be started on the far side of the aperture from which it is introduced, and the nozzle moved backward as the foam material is produced, rapidly displacing the water in the compartment. The material adheres to itself, forming a coherent mass of fairly rigid material, which also tends to adhere to surfaces with which it comes in contact, even when the surfaces are wet. It is therefore possible to rapidly fill the desired components one by one, until the vessel begins to recover its buoyancy. In order to obtain the proper "trim" of the vessel as it is rising, and when it is afloat again, it is desirable to begin with the uppermost compartment of the vessel and to judiciously manipulate the nozzle so that the vessel finally tends to float in an upright position. Of course, it is not necessary that the vessel be given anything like its original buoyancy, but only sufficient buoyancy so that it will rise to the surface, after which it can be towed away to a suitable location for further work. After the recovered vessel has been grounded or docked, the spongy plastic material can be readily removed, as it is of sufficiently soft consistency so that it can easily be cut with a knife or any similar implement, the foamy plastic produced by the mixture described herein is not particularly resilient, but, on the other hand, is rather pliable, and therefore can be removed in large chunks with relative ease.

In the event the vessel to be raised has been seriously damaged, or where the compartments which it is desired to fill with foam have too many apertures, it may be necessary to rig some temporary barricades in the apertures, which can be readily done by the divers in order to retain the plastic material where it is needed. It will be apparent that by judiciously distributing the plastic material throughout the vessel, a concentration of strain at any one point on the vessel can be avoided, and at the same time, the vessel can be given any desired "trim" so that it will float in a convenient position for easy handling.

For use in cold water, it is desirable to also heat the ingredients before they are combined, to insure sufficiently rapid foaming. This may be done on the vessel, and well insulated hose can be used, or alternatively, the power cable 22 can be made as a heater cable of well known type, to keep the hoses 7 and 8 at a suitable temperature. In either case it is desirable that the outer covering 24 of the cable be of reasonably good thermal insulating material.

It will be apparent that the embodiments shown are only exemplary and that various modifications can be made in construction and arrangement within the scope of my invention as defined in the appended claims.

I claim:
1. Apparatus for raising sunken ships comprising at least two containers for respective ingredients of a foaming plastic, a separate hose line connected to each such container, pump means for pumping fluid ingredients from said containers into said hose lines against a pressure head corresponding to the depth of a sunken ship, combining nozzle means at the free ends of said hose lines for combining said ingredients by chemical action solely within the nozzle at the point of exit from said hose lines to produce a foamed plastic material, and means for applying heat to said ingredients mounted adjacent said nozzle means to raise the temperature of said ingredients to maintain the chemical activity thereof.

2. The apparatus according to claim 1, said last means comprising electric heater means mounted on said nozzle means and water proof electric cable means supplying said heater means with current, said cable means and said hose means being fastened together along their length to form a unitary supply line.

References Cited in the file of this patent

UNITED STATES PATENTS

| | | |
|---|---|---|
| 2,410,314 | Sowerine | Oct. 29, 1946 |
| 2,653,139 | Sterling | Sept. 22, 1953 |
| 2,758,194 | Heron | Aug. 7, 1956 |
| 2,764,565 | Hoppe et al. | Sept. 25, 1956 |
| 2,779,689 | Reis | Jan. 29, 1957 |
| 2,809,268 | Heron | Oct. 8, 1957 |
| 2,860,856 | Bauer | Nov. 18, 1958 |
| 2,989,938 | Patterson | June 27, 1961 |

FOREIGN PATENTS

| | | |
|---|---|---|
| 995,768 | France | Aug. 22, 1951 |
| 950,050 | Germany | Oct. 4, 1956 |